United States Patent [19]

Horiuchi et al.

[11] 3,969,475

[45] July 13, 1976

[54] POWDER MOLDING PROCESS FOR PRODUCING THERMOPLASTIC ARTICLES

[75] Inventors: Yasuo Horiuchi, Yokohama; Toraichi Katsube, Kawasaki, both of Japan

[73] Assignee: Asahi Kasei Kogyo Kabushiki Kaisha, Osaka, Japan

[22] Filed: Dec. 20, 1974

[21] Appl. No.: 534,894

Related U.S. Application Data

[63] Continuation-in-part of Ser. No. 501,675, Aug. 29, 1974, abandoned.

[30] Foreign Application Priority Data

| Aug. 31, 1973 | Japan | 48-97904 |
| Dec. 26, 1973 | Japan | 49-143942 |
| Dec. 26, 1973 | Japan | 49-143943 |
| Dec. 26, 1973 | Japan | 49-143944 |
| Dec. 26, 1973 | Japan | 49-143945 |
| Dec. 26, 1973 | Japan | 49-143946 |
| May 15, 1974 | Japan | 49-53211 |

[52] U.S. Cl. .............................. 264/310; 264/311; 264/331
[51] Int. Cl.² ........................................ B29C 5/04
[58] Field of Search .......................... 264/310–311, 264/122, 126, 114, 300, 331

[56] References Cited
UNITED STATES PATENTS

| 2,887,728 | 5/1959 | Usab | 264/311 |
| 3,336,244 | 8/1967 | Rockoff | 264/126 |

Primary Examiner—Jeffery R. Thurlow
Attorney, Agent, or Firm—Stewart and Kolasch, Ltd.

[57] ABSTRACT

A novel powder molding process for producing thermoplastic articles having improved surface properties and the molded articles produced thereby. Molding compositions comprising a thermoplastic polymer in the powder state and a curable additive selected from the reactive monomers and prepolymers thereof, which are liquid at the melting or softening temperatures of the thermoplastic polymers, are subjected to powder molding wherein the heating rate of the molding composition during the linear portion of the temperature-time curve after the initiation of melting or softening of the thermoplastic polymer is maintained at a very low rate, i.e., less than 25°C. per minute. A curing agent may be added to the molding composition in order to control the curing time of the curable additives. The obtained thermoplastic articles have a cured thin surface layer of the curable additives, said surface layer being strongly combined with an inner layer of the thermoplastic articles.

10 Claims, 4 Drawing Figures

Cured surface-layer of the curable additive

Inner-layer of the molded article (X 1000)

FIG. 4

Surface of the molded article

Cured additive (X 1000)

FIG. 5

Bubble

Cured additive (X 30)

POWDER MOLDING PROCESS FOR PRODUCING THERMOPLASTIC ARTICLES

This application is a continuation-in-part of copending application Ser. No. 501,675, filed Aug. 29, 1974, now abandoned.

BACKGROUND OF THE INVENTION

This invention relates to a process for producing thermoplastic articles, and the molded articles of thermoplastic polymers produced thereby.

Many thermoplastic polymers have been used for preparing various kinds of molded articles. However, the molded articles made therefrom are generally poor in their surface properties. Therefore, there have been proposed heretofore many methods for improving the surface properties of the molded articles. The well-known and representative methods may be roughly divided into the following two methods:

1. Blending methods, and
2. Post-treating methods

The blending method is a well-known procedure for improving the properties of the molded articles, and said method comprises previously blending or mixing an additive with a base polymer and molding the resultant mixture to give the molded article. Many kinds of additives have been proposed in this regard in accordance with the purposes desired. The additives can be divided into compounds which are either compatible or incompatible with the base polymer, and they may constitute organic or inorganic compounds. However, generally, the compatible compounds are not very effective in improving the surface properties of the molded article, because they bleed or migrate to the surface of the molded article only to a small extent. In order to have the additive bleed to the surface of the molded article, the incompatible compounds are more effectively used. Among such incompatible compounds, low molecular weight substances have the advantageous property that they easily bleed to the surface of the molded article, but they have the drawback that they are easily peeled off when the molded article is used. Accordingly, such additives do not permanently improve the surface properties of the molded article. On the other hand, high molecular weight, incompatible compounds have the drawback that they do not sufficiently improve the surface properties of the molded articles, because they bleed only gradually to the surface of the molded article and the amount of additive which is bled to the surface of the molded article is very small. This amount can be increased by using a large amount of the compounds as additives, but the use of a large amount of the compounds decreases the original preferable properties of the base polymer. Hence, as mentioned above, there are many problems in the blending method.

The post-treating method is also a well-known method for improving the surface properties of the molded article, and many procedures have been used in this regard, such as (a) coating or adhering a material which can improve the surface characteristics on the surface of the molded article, and (b) treating the surface of the molded article by surface treating methods such as chromic acid treatment, a flame treatment, corona discharge and the like. In method (a), however, almost all of the coating materials employed have poor adhesiveness to the molded article and are sometimes easily peeled off when the molded article is used. Moreover, the coating materials or adhesives are generally expensive. In method (b), the operation or process required for treating the surface of the molded article is very complicated. Specifically, the following three procedural steps are generally necessary: (1) Preparing a molded article, (2) Degreasing the surface of the molded article by solvents, and (3) Treating the surface of the molded article with a treating method such as chromic acid treatment or the like. Furthermore, it is very difficult to uniformly improve the surface properties of the molded article when the shape of the molded article is complex. (See "The Improvement of Surface Properties" in "Plastic Age, March, 1971, page 135-142," Japan).

As mentioned above, the well-known methods for improving the surface properties of the molded article have many drawbacks and it has earnestly been desired in the art to find a simple and cheap method for improving the surface properties of molded articles permanently and sufficiently even if the shape of the molded article is complex.

SUMMARY OF THE INVENTION

One of the objects of the present invention is to provide a process for producing thermoplastic molded articles having improved surface properties.

A further object of the present invention is to provide a simple and cheap process for producing thermoplastic molded articles having permanently and sufficiently improved surface properties.

These and other more specific objects, features and advantages of the present invention will become apparent to those skilled in the art from a consideration of the following specification and claims, taken in conjunction with the accompanying drawings.

Basically, the present invention is concerned with a blending method. By the method of the present invention, specific curable additives are first blended with thermoplastic polymers which are in the powder state, and then the obtained mixture is subjected to a powder molding step under specific conditions, whereby the curable additives are bled to the surface of the molded article and are cured at said surface. The molded article obtained by the method of the present invention has good surface properties and does not have the problems or drawbacks of the prior art methods.

According to the present invention, a molding composition comprising (A) a thermoplastic polymer (base resin) in the powder state and (B) a curable additive comprising a reactive monomer or prepolymer which is liquid at the melting or softening point of the base polymer (A), is previously prepared by dry blending (A) with (B). Then, the molding composition is subjected to powder molding under the specific conditions discussed below, especially under a specific heating rate.

Examples of the powder molding method which are useful to perform the present invention are rotational molding, centrifugal molding, the Engel process and the like, which are all well known in the art.

In accordance with the present invention, the rate of heating of the composition is kept at a lower range during the linear portion of the temperature-time curve after the initiation of melting or softening of the thermoplastic polymer. The conditions of the heating rate will be hereinafter explained in detail.

Hence, the important and essential conditions in the present invention are that the base resin (A) is slowly melted, sintered and molded in a mold in order to bleed the curable additive (B) to the surface of the molded article. Therefore, the heating rate of the composition during the linear portion of the temperature-time curve after the initiation of melting or softening of the thermoplastic polymer is maintained at a lower range than in the conventional procedures normally employed.

In the commonly used powder molding methods, the basic principle followed is that the higher the heating rate of the molding composition, the shorter that the molding cycle will be. Accordingly, normal powder moldings are carried out at a high heating rate of the molding composition from the point of view of economics. Hence, there has been no suggestion in the field of the well-known powder molding techniques of utilizing a relatively low heating rate to improve the surface properties of the molded article obtained by the powder molding.

Many methods have been employed in the art for heating the mold for the powder moldings, for example, the hot-air convection method using commercially available gas or propane gas, spraying by molten salts and circulation of the heating medium in the inner jacket of a mold having double walls. In all of these well-known methods, the heating rate of the molding composition is generally 25° to 40°C. per minute. In the most commonly used hot-air convection method, the normal oven temperature is 300° to 380°C., and the corresponding heating rate is 25°C. to 40°C. per minute.

If the above normal heating rate is applied to the present invention, the objects of the invention cannot be attained because such a heating rate does not sufficiently make the curable additive bleed to the surface of the molded article. As a result, the major portion of the curable additive remains in the molded article. Moreover, the retained curable additive cures in the molded article, if the curable additive is heat-curable or if a curing agent is used together with the curable additive. If the curing agent is a peroxide compound, air bubbles form in the molded article and the curing agent does not effectively carry out its own function.

After extensive studies by the present inventors, it has been found that the curable additive is sufficiently bled to the surface of the molded article during the molding process, if the heating rate of the composition during the linear portion of the temperature-time curve after the initiation of melting of softening of the thermoplastic polymer is less than 25°C. per minute, preferably 10° to 20°C. per minute. Said composition is heated at a constant rate of heating after the initiation of melting or softening of the thermoplastic polymer. Accordingly, the above limitation regarding the heating rate of the composition is very important and constitutes the essential factor in the present invention. On the other hand, the heating rate until the initiation of melting or softening of the thermoplastic polymer is not so important and can be conducted as desired.

Another important and essential factor in the course of the powder molding process of the present invention is that the curable additive be cured after bleeding to the surface of the molded article. When a heat-curable additive is used as the curable additive in the present invention, it is naturally cured after bleeding to the surface of the molded article. And, as a matter of course, when a non-heat curable additive is used, although it is not naturally cured after bleeding to the surface of the molded article, the use of a curing agent together with the non-heat curable additive helps the non-heat curable additive to cure naturally after bleeding to the surface of the molded article. Furthermore, when a non-heat curable additive is used, it may be also possible to post-cure the additive on the surface of the molded article after the molded article is discharged.

Figure 1:
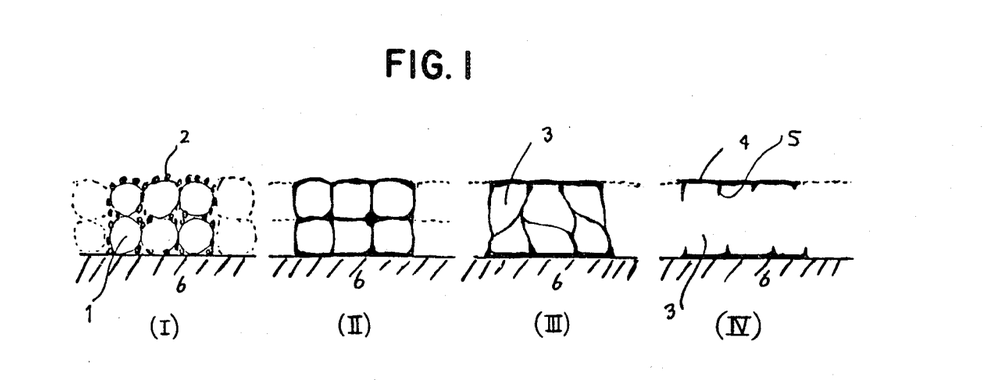
FIG. 1 shows a model in schematic form as an aid in explaining the principle of the molding process of the present invention.

The principle of the molding process of the present invention will be clearly explained by the attached FIG. 1.

I shows the stage where a base powder 1 and a curable additive 2 in the mold 6 are mixed, wherein the curable additive is adsorbed on the surface of the base resin.

II shows the stage where the mixture of the base resin and the curable additive is sintered by heating.

III shows the stage where the mixture of the base resin and the curable additive is sinter-melted, and where the curable additive gradually bleeds to the surface of the molded article 3 by utilizing a lower heating rate than those conventionally employed.

IV shows the stage where the molding is finished, wherein the curable additive is bled to the surface of the molded article 3 and cured thereat. As a further explanation thereof, 4 indicates a cured additive on the surface of the molded article 3, and 5 shows a cured additive near the surface of the molded article 3. In reality, 5 is continuously combined with 4. The cured surface layer, as indicated by 4 and 5, is strongly combined with the inner layer of the molded article. The boundary between the surface layer and the inner layer is irregular and not uniform. Therefore, the molded article of the present invention has an anchor effect therein. This anchor effect may contribute to the attainment of the objects of the present invention. Furthermore, the surface layer exists on the whole surface of the molded article, because the curable additive is all substantially bled to the surface of the molded article.

The reason why the process of the present invention has only been described with reference to the powder molding method is because the powder molding method is the only method which can perform the objects of the present invention. Generally, for the purpose of producing a molded article, other molding methods, such as injection molding and extrusion molding, are well-known and used. But, if the molding composition of the present invention is molded by the injection or extrusion molding method, the curable additive must be uniformly mixed with the base resin in the molding machine, and therefore, the curable additive is scarcely bled to the surface of the resultant molded article. Accordingly, it is insufficient to improve the surface properties of the molded article by the injection or extrusion molding method. Furthermore, when using these methods, almost all of the curable additive is cured within the inner portions of the molded article, with the result that the original preferable properties of the base resin are adversely affected. On the other hand, increasing the amount of the curable additive would appear to improve the surface properties of a molded article made by the injection or extrusion molding method, however, once again, the original preferable properties of the base resin are adversely affected if this procedure is used. Hence, the injection or extrusion molding method cannot be applied to the composition and process of the present invention. Moreover, as discussed above, the objects of the present invention are only achieved by the specific powder molding method, not the normal powder molding method, described herein.

The primary advantage of the present invention is to improve the surface properties of the resultant molded article, especially its adhesiveness, coating property, gas barrier properties, low shrinkage value, small warpage, hardness of the surface of the molded article, chemical-resistance properties and electrical properties. These advantages result from the fact that the cured surface layer of the curable additive is formed on the surface of the molded article, the cured surface layer is strongly combined with the inner layer of the molded article, and the boundary between the surface layer and the inner layer is irregular and not uniform.

The surface properties of the molded article can be improved with a small amount of the curable additive by using the powder molding method of the present invention since the main portion of the added curable additive is bled to the surface of the molded article. Therefore, most of the original preferable properties of the base resin are not affected. In fact, it is possible to upgrade the physical properties of the base resin, for example, its high impact properties, by following the procedure of the present invention. Furthermore, the curable additive is bled to the total surface of the molded article, and not only to the mold face. The surface appearance of the molded article is as good as that of molded articles obtained by normal powder molding without any additives.

The base resin (A) used in the present invention is a thermoplastic polymer in the powder state which can be shaped by powder molding methods, such as polyolefins, for example, low-, medium- and high-density polyethylene, polypropylene and polybutene-1 and copolymers of olefins such as ethylenevinyl acetate copolymers; polyamides; polycarbonates; polyoxymethylene; polyvinyl chloride; polystyrene; acrylonitrile-butadiene-styrene (ABS) copolymer; butyrate resins; acrylic resins, for example, alkyl methacrylate and acrylate resins such as polymers of methyl methacrylate, methyl acrylate, ethyl methacrylate, ethyl acrylate and the like, and derivatives thereof. Natural or synthetic rubbers which are compatible with the base resin may be added to the above resins. Moreover, it is possible to admix fillers and reinforcing materials, such as woodmeal, cellulose, talc, asbestos, glass fibers, glass powder, silica, mica and graphite in the base resin, and still retain the advantageous effects of the present invention. The thermoplastic polymer having a particle size of not more than about 30 mesh is advantageously used. A 30 mesh powder hereinafter means that about 100 percent of the polymer will pass through a 30 mesh screen (the ASTM Standard sieve). Moreover, the preferred particle size of the thermoplastic polymer is from about 30 mesh to about 100 mesh, and most preferably from about 40 mesh to about 70 mesh.

The curable additive (B) used in the present invention is at least one compound selected from reactive monomers and prepolymers thereof which are in the liquid state at the melting or softening temperature of the base resin (A). The curable additive is the compound to be cured at the surface of the molded article after the main portion of the curable additive has been bled to the surface of the molded article. The reason why the curable additive is limited as described above is as follows. If the curable additive is a solid at the melting or softening temperature of the base resin, it is difficult for the curable additive to bleed to the surface of the molded article. On the other hand, if the curable additive is a very low molecular weight and volatile material which is gaseous at the melting or softening temperature of the base resin, the curable additive may be volatilized by heating before being cured on the surface of the molded article. Furthermore, if the curable additive is easily curable at low temperatures, for example, at room temperature, it is cured within the inner parts of the molded article before being bled to the surface of the molded article. If this occurs, the additive will not improve the surface properties of the molded article, but, rather, will detract from the original preferable properties of the base resin. Therefore, it is important to control the stage of the curing action by properly selecting the curing conditions.

The curable additives which may be used in the practice of the present invention are as follows: polymerizable unsaturated compounds, for example, allyl ester monomers such as diallyl phthalate and triallyl cyanurate, and prepolymers thereof; at least one compound selected from diene polymers and modified materials thereof having an absolute viscosity of 1 to 10,000 poise at 25°C., diene polymers such as polyisoprene, polybutadiene and copolymers of isoprene or butadiene and monomers which are copolymerizable with isoprene or butadiene, and modified diene polymers such as partially hydrogenated diene polymers, diene polymers having terminal —OH or —COOH substituents, derivatives thereof having tertiary asymmetric carbons with maleic groups, and derivatives thereof wherein a part of the main chain contains an oxirane oxygen; unsaturated polyester compounds comprising unsaturated polyester oligomers obtained by a condensation reaction with unsaturated dicarboxylic acids, saturated dicarboxylic acids and polyhydroxy alcohols and oligomers of vinyl esters and copolymerizable vinyl monomers; acrylic syrups obtained by prepolymerizing acrylic alkyl ester monomers or methacrylic alkyl ester monomers; polyisocyanate compounds and polyols, and prepolymers thereof which are capable of reacting to give a polyurethane resin by addition polymerization; urea-formaldehyde precondensates which are obtained by dehydration and concentration of methylol amino compounds obtained by reacting amino compounds such as urea and melamine with formaldehyde; epoxy compounds, which are curable by an organic amine, organic acid, Lewis acid or by heating, being of the bisphenol, glycidyl, cycloaliphatic or novolak type; precondensates which are polymerizable by heating or an acid catalyst, such as a furan resin, resol resin or xylene resin; and mixtures thereof.

In case that polyisocyanates and polyols are used as the curable additive, two methods can be used in order to improve the coating property of the molded articles. One method is to mold the thermoplastic composition containing a mixture of polyisocyanates and polyols. Another method is first to mold the thermoplastic composition containing either the polyisocyanate or polyol, and then to coat the polyols or polyisocyanates, respectively, especially in the form of paints, on the surface of the molded article.

There are many combinations between the base resin (A) and the curable additive (B) for improving the various surface properties of the molded article. Representative examples are as follows:

| Base resins | Curable additives | Objects |
| --- | --- | --- |
| Medium- or high-density polyethylene or Polypropylene | Diallyl phthalate 1,2-Polybutadiene Unsaturated polyester Epoxy compounds | Coating property |
| | Diallyl phthalate Unsaturated polyester Epoxy compounds Acrylic syrups | Oil resistance |
| Low-density polyethylene or Ethylene-vinyl-acetate copolymer | Diallyl phthalate Unsaturated polyester Urea-formaldehyde precondensate | Hardness of the surface of the molded articles |
| Polyoxymethylene | Diallyl phthalate Expoxy compounds | Coating property |
| ABS resin | Diallyl phthalate Epoxy compounds Polyisocyanate and polyols Urea-formaldehyde precondensates | Resistance to chemicals and organic solvents |

The amount of the curable additive used in the present invention can be varied from about 0.5% to 15.0% with respect to the amount of the base resin. The preferred amount of curable additive used is from about 1.0% to about 10.0%, and most preferably from about 2.0% to about 5.0% with respect to the amount of the base resin. All parts, proportions and percentages herein are by weight unless otherwise indicated.

If the amount of curable additive employed is too small, the advantageous effects of the present invention cannot be attained. On the other hand, if the amount is too large, the original properties of the base resins are adversely affected. Accordingly, the amounts of curable additive noted herein must be used in order to meet the objectives of the invention.

A curing agent may be added to the molding composition in order to control the curing conditions of the curable additive. The curing agent is selected in accordance with the type of curable additive employed, the nature of the base resin, the conditions of molding and the like. A curing agent such as a peroxide, an acid catalyst or an amine catalyst is preferably used. If an organic or inorganic peroxide is used as the curing agent, its decomposition temperature if preferably more than 70°C. The amount of the curing agent such as a peroxide to be used in practice is from about 0.01% to about 5.0%, and preferably from about 0.05% to about 1.0% with respect to the base resin.

In the present invention, it is preferable to use a mold release agent in order to readily remove the molded article from the mold. A mold release agent which has good heat resistance and which does not influence the moldability of the composition is preferably used. Moreover, the mold release agent should not be transferable to the surface of the molded article, or if it does transfer to the surface of the molded article it should be easily washable therefrom by water, alcohol or other solvents. As the mold release agent, substances such as baking varnish, paintable silicone and the like, are preferably employed.

Figure 3:
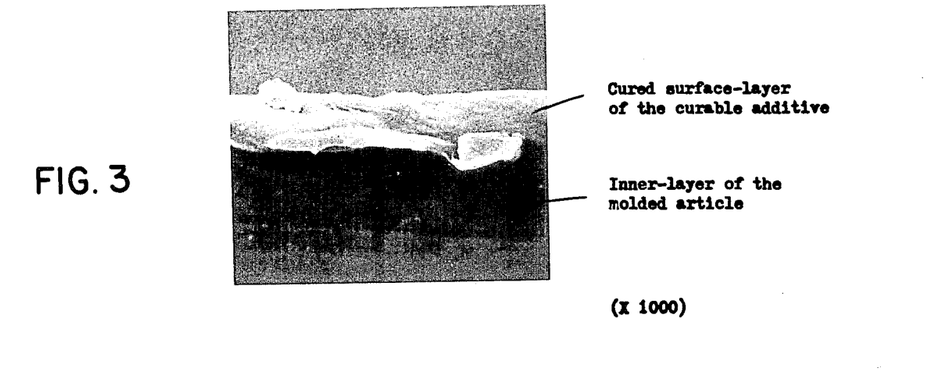
FIG. 3 and FIG. 4 show photographs by an electron microscope (1000 × magnification) of a sectional portion of the molded article in Example 1 and Comparative example 2, respectively.
Figure 4:
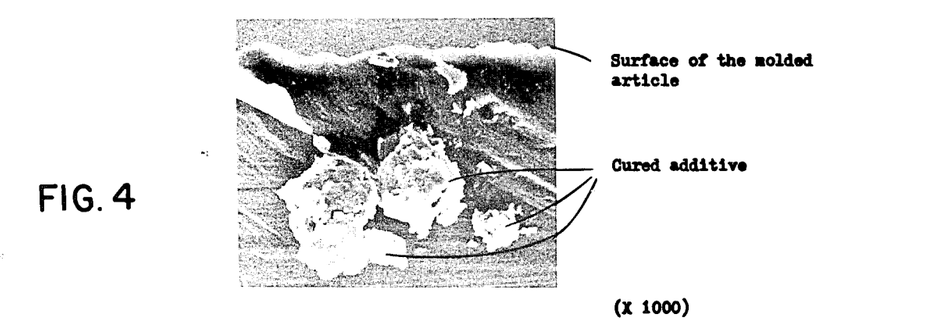
Figure 5:
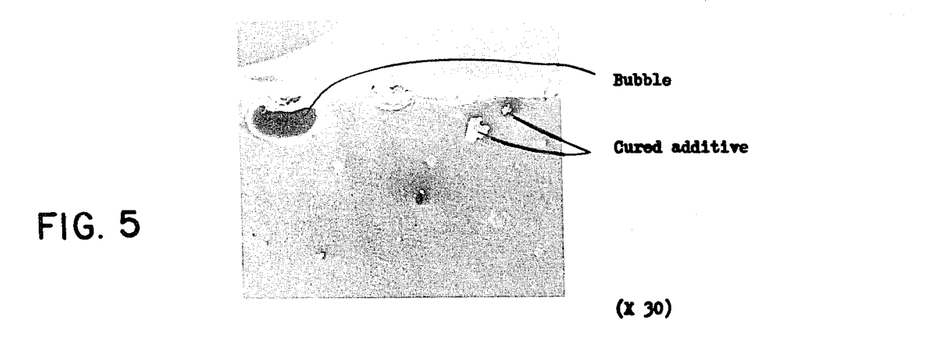
FIG. 5 shows a photograph by an electron microscope (30 × magnification) of a sectional portion of the molded article in Comparative example 3.

The photographs in FIGS. 3, 4 and 5 are pictures of a sectional portion of the molded article having the same composition that has been molded by different processes, in order to clarify the effect of the present invention.

FIG. 3 is a photograph of a sectional portion of a molded article which is obtained by the process of the present invention, that is, by rotational molding using a lower heating rate than is conventionally employed. FIG. 3 shows that the cured surface layer of the curable additive has an average thickness of about 10μ, and that the curable additive is bled to the surface of the molded article. The boundary between the surface layer and the inner layer of the molded article is irregular and not uniform. Accordingly, it can be seen that the cured surface layer of the curable additive is strongly combined with the inner layer of the molded article.

FIG. 4 is a photograph of a sectional portion of a molded article which is obtained by the general injection molding process. FIG. 4 shows that the curable additive is not sufficiently bled to the surface of the molded article, and that the cured additive remains in the molded article.

FIG. 5 is a photograph of a sectional portion of a molded article which is obtained by rotational molding using the generally employed heating rate. FIG. 5 shows that the curable additive is not sufficiently bled to the surface of the molded article, and that the cured additive remains in the molded article. In addition, FIG. 5 shows the presence of air bubbles caused by the too rapid decomposition of the curing agent.

The following Examples are given merely as illustrative of the present invention and are not to be considered as limiting.

EXAMPLES OF THE INVENTION

Example 1

Figure 2:
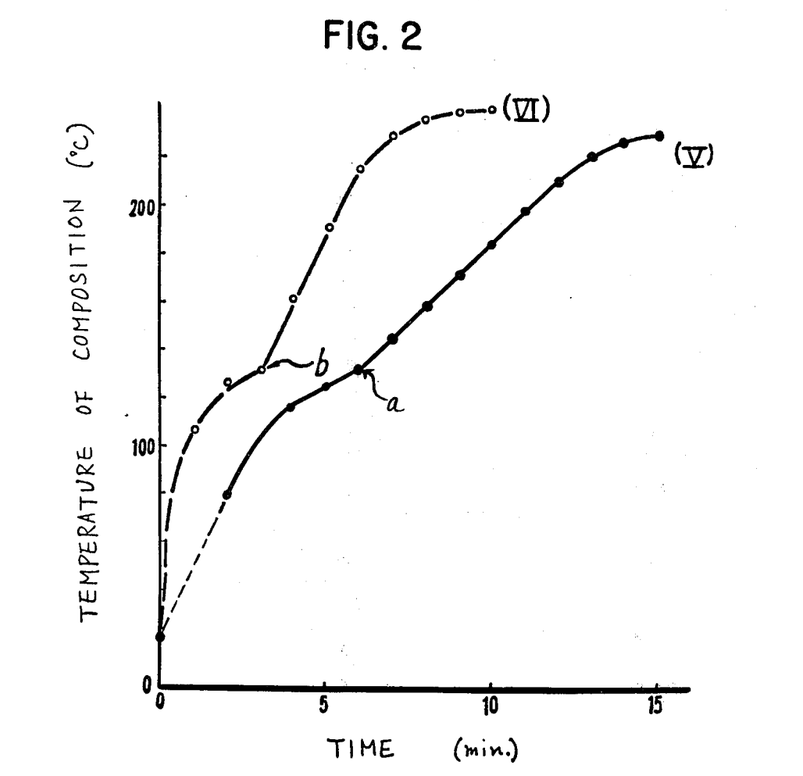
FIG. 2 shows the relationship between the heating time and the temperature of the composition while the composition is molded. Curves (V) and (VI) show the temperature change with time of the composition in Example 1 and Comparative example 3, respectively. Points (a) and (b) show the endothermic reaction upon melting of the composition.

A composition is prepared by mixing diallyl phthalate monomer, diallyl phthalate prepolymer and 2,5-dimethyl-2,5-di(t-butylperoxy)-hexyne-3 in the proportions shown in Table 1 with high density polyethylene powder (Melt index 7g/10 min., Density 0.955 g/cm$^3$, mesh size range by ASTM Standard sieve 40–70 mesh) for 6 minutes with a high-speed mixing apparatus (75-liter Henschel mixer). 650 g. of the resulting composition is charged into a cast aluminum mold having a wall thickness of about 6 mm, the inner size of the mold being 300 mm × 300 mm × 50 mm, and the mold with a vent tube is heated by hot air at 240°C. for 15 minutes in a heating chamber by rotating the mold in two perpendicular shafts at 12 r.p.m. for one shaft and 5 r.p.m. for the other shaft, after which a product is discharged from the mold after air-cooling for 5 minutes, water-spraying for 7 minutes and hydroextracting for 3 minutes. The resulting product is a box having a thickness of about 3 mm. The temperature of the composition is measured by a thermocouple through one shaft while the composition is being molded, and the temperature change is shown by (V) in FIG. 2, the heating rate thereof being about 13°C. per minute. The heating rate is calculated by extending the initial linear portion of the temperature-time curve after the initiation of melting of the high density polyethylene (Point (a) in FIG. 2). As a mold release agent, paintable silicone (Commercial name; KF 412 made by Shinetsu Silicone Co. Ltd., Japan) which can be easily removed by water and alcohol, is coated on the mold face before the composition is charged into the mold.

A noted above, FIG. 3 shows a photograph of a sectional portion of the product obtained by means of an electron microscope (1000 × magnification).

A plain plate having a size of 100 mm × 50 mm is prepared as a test piece from the product. The test piece is washed with a neutral detergent and dried. The test piece is sprayed one time with paint and dried by air for a whole night. Then, the test piece is dried by heating at 70°C. for 1 hour. The paints sprayed thereon are a lacquer paint of the acrylic-cellulose type (Commercial name: AERON, made by Kansai Paint Co. Ltd., Japan), phthalic acid resin paint (Commercial name: SUNPHTHAL, made by Nihon Paint Co. Ltd., Japan), and urethane resin paint (Commercial name: POLYAUTO, made by Kuboko Paint Co. Ltd., Japan).

An adhesive test is conducted by counting the number of squares remaining after an adhesive-tape has been peeled from 100 squares which are cross cut by a knife on the painted surface of the dried test piece. The results are shown in Table 1 by the number of the remaining squares/100.

The other painting and adhesive tests shown hereinafter were conducted in accordance with the same procedure as described herein.

Furthermore, the mechanical properties of the product were measured by the method of Note 2 at the bottom of Table 1. All of these results are shown in Table 1.

Comparative Example 1

The same high density polyethylene powder as is used in Example 1 is molded in the absence of any additives under the same conditions as used in Example 1. The heating rate is almost the same as in Example 1. In this case, a mold release agent is not necessary to release the resulting product from the mold. The test piece is prepared and the painting and adhesive tests are conducted by the same methods as in Example 1. The mechanical properties of the product are also measured.

The results are shown in Table 1.

Comparative Example 2

75 g. of the same composition as used in Example 1 is molded by injection molding using a 5-ounce in-line screw type injection machine (IS-80 made by Toshiba Kikai Co., Ltd., Japan), at 250°C. for the cylinder and 50°C. for the mold, for 20 seconds and the molded product is cooled for 30 seconds. The resulting product is a plain plate having the dimensions of 150 mm × 150 mm × 3 mm.

The results of the painting and adhesive tests and mechanical properties are shown in Table 1. A photograph of a sectional portion of the product by an electron microscope (1000 × magnification) is shown in FIG. 4.

Comparative Example 3

650 g. of the same composition as used in Example 1 is molded by rotational molding using a higher heating rate than in Example 1. The mold including the composition is heated at 330°C. for 10 minutes. The temperature of the composition is measured by the same thermocouple as used in Example 1 while the composition is being molded. The temperature change is shown by (VI) in FIG. 2, wherein the heating rate of the composition is about 30°C. per minute. The heating rate is calculated by extending the initial linear portion of the temperature time curve after the initiation of melting of the high density polyethylene (Point (b) in FIG. 2). This heating rate is generally employed in the case of using a hot-air type rotational molding machine. The other conditions are the same as used in Example 1.

A photograph of a sectional portion of the product by an electron microscope (30 × magnification) is shown in FIG. 5, whereby it is clear that air bubbles are present which are caused by the decomposing gas of the peroxide and, further, that the additives are not sufficiently bled to the surface of the molded article and are therefore cured in the article. Hence, it is clear that the properties of this article are very poor because of the many bubbles which are present under the surface of the article.

Examples 2 and 3 and Comparative Examples 4 and 5

The same amounts of the same compounding ingredients as used in Example 1 are mixed with (Example 2) polypropylene (Melt index 8, Density 0.91, a 30 mesh powser by the ASTM Standard sieve), or with (Example 3) polyoxymethylene copolymer (Melt index 9, Density 1.40, 30 mesh powder, rotational molding grade), dried at 90°C. for 3 hours, by means of a 75-liter Henschel mixer, and then each mixed composition is molded by rotational molding using nitrogen gas blown through the pipe of a rotary shaft. The other molding conditions are the same as used in Example 1.

The same polypropylene (Comparative Example 4) or polyoxymethylene copolymer (Comparative Example 5) as used above, but without the compounding ingredients, is molded under the same conditions as used above.

The same tests as described above are conducted on the resulting four molded products, and the results are shown in Table 2.

It is difficult to coat paints directly on polyolefin and polyoxymethylene articles because these resins are nonpolar and crystalline (Comparative Examples 4 and 5). However, the articles of the present invention (Examples 2 and 3) can be coated very easily with paints and do not require any primer coat. Furthermore, it is clear that the adhesiveness of the paints is sufficient in practice, and that the original mechanical properties of the base resins are not diminished. On the contrary, the impact properties of the molded articles obtained in Examples 2 and 3 are actually increased by the procedure of the present invention.

Example 4

3.0 phr. of the same diallyl-o-phthalate prepolymer (P-DAP) as used in Example 1 is mixed with the same polyoxymethylene copolymer as used in Example 3. The molding conditions are the same as used in Example 1. Tests on the resultant molded articles are conducted and the results are shown in Table 2.

Examples 5 to 8 and Comparative Examples 6 to 9

The compounding ingredients as prescribed in Table 3 are mixed with the base resins as indicated in Table 3, and each composition is molded by rotational molding under the heating condition of the oven as stated therein. The other molding conditions are the same as used in Example 1. The base resins are, respectively, an ABS resin (acrylonitrile-butadiene-styrene copolymer, density 1.05, 30 mesh powder, rotational molding grade), Nylon 11 (density 1.03, melting point 192°C., 30 mesh powder rotational molding grade), polycarbonate (Melt index 8, density 1.20, 30 mesh powder, rotational molding grade), and acrylic resin (methyl methacrylate 90% by mol., methyl acrylate 10% by mol., 30 mesh powder). The ABS resin is dried at 80°C. for 2 hours before mixing. The polycarbonate is dried at 120°C. for 2 hours before compounding. The acrylic resin is dried at 80°C. for 3 hours before mixing. In the case of using the polycarbonate or acrylic resin, nitrogen gas is blown through the pipe of the rotary shaft while the composition is molded.

In Comparative Examples 6 to 9, each base resin of Examples 5 to 8 is molded under the same conditions as is used in the corresponding Example.

Tests on the above molded articles are conducted and the results are shown in Table 3.

Examples 9 to 16

The compounding ingredients as prescribed in Table 4 are mixed with high-density polyethylene powder as used in Example 1, and the composition is molded under the same conditions of rotational molding as used in Example 1.

The MMA (methyl methacrylate) syrup in Example 12 is prepared by polymerizing 100 g. of purified methyl methacrylate monomer with 0.07 g. of azobis-isobutyronitrile at 80°C. for 40 minutes and by quenching the active end thereof when the concentration of the polymer becomes 20%. The obtained MMA syrup is transparent.

The precondensate of the furan resin in Example 15 is liquid and is prepared by the following procedure. 500 g. of furfuryl alcohol and 500 g. of water with 2.5 g. of 85% phosphoric acid are added into a 2 liter-vessel and reacted at 60°C. for 5 hours with stirring. The reaction product is treated with an aqueous solution of sodium hydroxide to give a pH of 5, and water is eliminated therefrom by inclination and suction dehydration.

The resol resin in Example 16 is a 70% by weight solution and is prepared by the following procedure. One mole of phenol, a 37% aqueous solution of formalin including 1.5 moles of formaldehyde and 2 g. of a 26% aqueous ammonia solution are charged into a 500 ml. vessel having a reflux condenser on a water bath. The mixture is heated gradually to 80°C. and reacted for 5 hours. The reaction product is neutralized with phosphoric acid, water is eliminated therefrom by inclination and heating dehydration, and then the product is diluted with ethyl alcohol for the purpose of decreasing the viscosity of the solution.

The results of adhesion tests with various paints are shown in Table 4.

Example 17 and Comparative Examples 10 and 11

Curable additives as described in Table 5 are mixed with the same polyethylene powder as used in Example 1. The mixture is molded by the same rotational molding process as described in Example 1, and a box having a thickness of about 3 mm is obtained.

Plain test plates having a size of 100 mm × 50 mm are cut out from the box. Each test plate is sprayed one time by a lacquer paint of the acrylic-cellulose type (Commercial name: AERON) or phthalic acid resin paint (Commercial name: SUNPHTHAL) and is dried for a whole night.

Electron rays (300 kV) are irradiated on the above test plates by an electron radiation accelerator having a maximum electric voltage of 500 kV. In this case, the current value is 3 mA and the exposed dose is 20 Mrad. The adhesion of the paints on the cured test plate is shown in Table 5.

In Comparative Example 10, the same test plates as obtained above are not irradiated at all and are tested as to their adhesion for paints. The results are shown in Table 5. In this case, as the curable additives are not cured on the surface of the molded product, the adhesion for the paints is poor and the surface of the test plates is greasy.

In Comparative Example 11, polyethylene alone (without any additives) is molded by rotational molding. The test piece is irradiated with the same amount of electron rays as used in Example 17, and it is painted with the same paints as used in Example 17. The adhesion for these paints is shown in Table 5.

Example 18

430 g. of the same composition as used in Example 12 is molded by rotational molding at 240°C. for 12 minutes by a hot air. The other molding conditions are the same as described in Example 1. A box having a thickness of about 2 mm, and a cured thin surface-layer of polyurethane is obtained. A circular plate having a diameter of 100 mm. is cut out from the box. This plate is used as the cover plate of an aluminum vessel having an inside diameter of 80 mm. and a height of 15 mm. The vessel contains about 20 ml. of industrial gasoline. A fluorocarbon rubber packing is placed between the cover plate and the vessel, and the gaps between them are sealed sufficiently in order that the gasoline does not ooze out. The loss of weight is 0.177 g. after the plate has been left to stand at 20°C. for 30 days.

As a comparison, the same test as described above is conducted by using high density polyethylene including no additives as a molding resin. In this case, the loss of weight is 0.895 g. under the same conditions as described above. Furthermore, the polyethylene plate tested as a cover plate becomes recessed to the inside because of reduced pressure, since the gasoline passes through the polyethylene plate. Moreover, the polyethylene plate becomes softer by swelling than the polyethylene plate having a cured thin surface-layer of polyurethane. According to the above results, it is clear that the cured thin layer of polyurethane on the surface of the polyethylene article inhibits the gasoline permeability.

Example 19

The same composition as used in Example 1 is molded by rotational molding. An aluminum plate is placed in the mold. The other molding conditions are the same as used in Example 1. The aluminum plate of 100 mm × 100 mm × 0.5 mm having a degreased surface is fixed on the inner plane of the mold by screws. A mold release agent (Commercial name: Shinetsu Silicone KS 707) is coated on the inner surface of the mold except on the half-surface of the fixed aluminum plate (50 mm × 100 mm). After molding, the fixed aluminum plate is disengaged from the screws, and the molded article is discharged from the mold. The molded article is a box which is laminated by an aluminum plate on the outer surface thereof. Test pieces in the form of a long strip having a width of 1 inch and a thickness of 3 mm. are obtained. The result of the peel test of 180° according to ASTM-D1876 between the resin part and the aluminum plate is 18.2 kg/inch.

As a comparison, the same test as described above is conducted by using the same material and the same molding conditions as in Comparative Example 1. The result of the peel test is 0.3 kg/inch.

Examples 20 to 25 and Comparative Example 12

The mixture of 1,2-polybutadiene dicarboxylic acid (C-PB, number average molecular weight: 1000)/diallyl-o-phthalate monomer (M-DAP)/2,5-dimethyl-2,5-di(t-butylperoxy)-hexyne-3(PO-1) being 2/1/0.05 (by weight) is mixed with high density polyethylene as used in Example 1, by the amount as described in Table 6, respectively (Examples 20 to 25). The molding conditions are the same as used in Example 1. The same high density polyethylene as used above is molded under the same conditions as used above (Comparative Example 12).

The resultant article in Comparative Example 12 is caved in about 10 mm at the center of the article. On the other hand, the molded article in Example 21 is caved in less than 1 mm at the center of the article, and the almost complete size of the article is retained. The results of painting tests by a lacquer paint of the acrylic-cellulose type (Commercial name: AERON) and the mechanical properties are shown in Table 6.

Examples 26 to 27 and Comparative Examples 13 to 17

Example 1 at 60°C. by a high-speed mixing apparatus (Composition 1).

6 parts of an ethylacetate solution containing 50% trimethylrolpropane toluenediisocyanate adduct (NCO content 13%) are mixed with 100 parts of the same polyethylene as described above at 60°C. by the same apparatus as used above, and the retained ethylacetate is eliminated at 50°C. for 3 hours by vacuum (Composition 2).

Each Composition (1 and 2) is molded by the same conditions as used in Example 1 (at 240°C. for 15 minutes) and Comparative Example 3 (at 330°C. for 10 minutes) respectively.

The same polyethylene as used above is molded by the same condition as used in Comparative Example 3.

Test pieces having a size of 100 mm × 50 mm are prepared from the above products, respectively.

The test pieces obtained from Composition 1 and polyethylene are dipped in an ethylacetate solution containing 50% trimethylolpropane-toluenediisocyanate adduct (NCO content 13%). The test pieces are dried at room temperature for 30 minutes by air and left to stand at 80°C. for 1 hour in a hot-air oven (Example 26 and Comparative Examples 14 and 17).

The test pieces obtained from Composition 2 are dipped in an ethylacetate solution containing 20% prepolymer having hydroxy groups at the terminal ends thereof which is obtained from the reaction of phthalic acid, adipic acid, propylene glycol and toluenediisocyanate (OH value: not more than 1). The test pieces are dried at room temperature for 30 minutes by air and left to stand at 80°C. for 1 hour in a hot-air oven (Example 27 and Comparative Example 16).

The test pieces obtained from Compositions 1 and 2 by the same molding condition as used in Example 1 (at 240°C. for 15 minutes) are left to stand at 80°C. for 1 hour in a hot-air oven (Comparative Examples 13 and 15).

The coating tests by a lacquer paint of the acrylic-cellulose type (Commercial name: AERON) are conducted on the resultant seven test pieces, and the results are shown in Table 7.

TABLE 1

| | Compounding ingredient (amount, phr) (Note 1) | | | Mechanical properties (Note 2) | | | | Adhesion for Paints | | | REMARKS |
|---|---|---|---|---|---|---|---|---|---|---|---|
| | | | | YS | TE | TM | Izod | AERON | SUNPHTHAL | POLYAUTO | |
| Example 1 | M-DAP (1.5) | / P-DAP (1.5) | / PO-1 (0.05) | 227 | 320 | 9,600 | 5.8 | 100/100 | 100/100 | 100/100 | Rotational molding |
| Comparative Example 1 | | none | | 250 | 400 | 11,400 | 4.3 | 0/100 | 0/100 | 0/100 | Rotational molding |
| Comparative Example | M-DAP (1.5) | / P-DAP (1.5) | / PO-1 (0.05) | 200 | 250 | 7,800 | 2.6 | 20/100 | 20/100 | 20/100 | Injection molding |

(Note 1) M-DAP : Diallyl-o-phthalate monomer: Solution vicosity 8.4 cps (50% Methyl ethyl ketone solution, at 30°C)
P-DAP : Diallyl-o-phthalate prepolymer: Solution viscosity 5–30 cps (50% Methyl ethyl ketone solution, at 30°C)
PO-1 : 2,5-Dimethyl-2,5-di(t-butylperoxy)-hexyne-3
(Note 2) Tensile properties by ASTM D638 (Strain rate : 50 mm/min.)
YS : Yield strength under tension (kg/cm²)
TE : Tensile elongation at break (%)
TM : Tensile modulus of elasticity (kg/cm²)
Impact properties by ASTM D256 - Izod: Notched Izod impact strength (kg-cm/cm)

3 parts of 1,2-polybutadiene dihydroxide are mixed with 100 parts of high density polyethylene as used in

TABLE 2

| | Thermoplastic resin | Compounding Ingredient (amount, phr) | Mechanical properties | | | | Adhesion for Paints | | |
|---|---|---|---|---|---|---|---|---|---|
| | | | YS | TE | TM | Izod | AERON | SUNPHTHAL | POLYAUTO |
| Example 2 | Polypropylene | The same as used | 25 | 20 | 18,000 | 4.7 | 100/100 | 100/100 | 100/100 |

TABLE 2-continued

|  | Thermoplastic resin | Compounding Ingredient (amount, phr) | Mechanical properties | | | | Adhesion for Paints | | |
|---|---|---|---|---|---|---|---|---|---|
|  |  |  | YS | TE | TM | Izod | AERON | SUNPHTHAL | POLYAUTO |
| Comparative Example 4 | Polypropylene | none in Example 1 | 280 | 25 | 19,000 | 4.2 | 0/100 | 0/100 | 0/100 |
| Example 3 | Polyoxymethylene | The same as used in Example 1 | 600 | 10 | 28,000 | 5.7 | 100/100 | 100/100 | 100/100 |
| Comparative Example 5 | Polyoxymethylene | none | 620 | 15 | 30,000 | 5.5 | 25/100 | 25/100 | 0/100 |
| Example 4 | Polyoxymethylene | P-DAP (3.0) | 610 | 10 | 28,000 | 5.6 | 100/100 | 100/100 | 90/100 |

TABLE 3

|  | Thermoplastic resin | Compounding ingredients (amount, phr) (Note 3) | | | Heating Condition of the oven | Adhesion for Paints | | Heating rate (per minute) |
|---|---|---|---|---|---|---|---|---|
|  |  |  |  |  |  | AERON | POLYAUTO |  |
| Example 5 | ABS | C-PB (2.0) / | M-DAP (1.0) / | PO-2 (0.05) | 230°C. × 15 min. | 100/100 | 100/100 | 12°C. |
| Comparative Example 6 | ABS |  | none |  | 230°C. × 15 min. | 65/100 | 70/100 | 12°C. |
| Example 6 | Nylon-11 | C-PB (2.0) / | M-DAP (1.0) / | PO-1 (0.05) | 280°C. × 15 min. | 100/100 | 100/100 | 19°C. |
| Comparative Example 7 | Nylon-11 |  | none |  | 280°C. × 15 min. | 0/100 | 0/100 | 19°C. |
| Example 7 | Polycarbonate | C-PB (2.0) / | M-DAP (1.0) / | PO-1 (0.05) | 280°C. × 15 min. | 100/100 | 100/100 | 19°C. |
| Comparative Example 8 | Polycarbonate |  | none |  | 280°C. × 15 min. | 20/100 | 0/100 | 19°C. |
| Example 8 | Acrylic resin | C-PB (2.0) / | M-DAP (1.0) / | PO-2 (0.05) | 230°C. × 15 min. | 100/100 | 100/100 | 12°C. |
| Comparative Example 9 | Acrylic resin |  | none |  | 230°C. × 15 min. | 50/100 | 0/100 | 12°C. |

(Note 3) C-PB : 1,2-Polybutadiene dicarboxylic acid, number average molecular weight : 1000
PO-2 : Lauroyl peroxide The other compounds are the same as described in Note 1 of Table 1

TABLE 4

|  | Compounding ingredients (amount, phr) | | | Adhesion for Paints (Note 4) | | |
|---|---|---|---|---|---|---|
|  |  |  |  | AERON | SUNPHTHAL | POLYAUTO |
| Example 9 | C-PB (2.0) / | M-DAP (1.0) / | PO-1 (0.05) | 100/100 | 100/100 | 100/100 |
| Example 10 | M-DAP (3.0) / |  | PO-1 (0.1) | 95/100 | 95/100 | 90/100 |
| Example 11 | UPE-St (2.5) / |  | PO-1 (0.03) | 100/100 | 100/100 | 100/100 |
| Example 12 | MMA Syrup (5.3) / |  | PO-2 (0.04) | 95/100 | 97/100 | 100/100 |
| Example 13 | A₁ (1.9) / |  | B₁ (1.1) | 100/100 | 100/100 | 100/100 |
| Example 14 | EPX (3.0) / |  | DICY (0.25) | 100/100 | 100/100 | 100/100 |
| Example 15 | Furan resin (4.0) / |  | Benzenesulfonic acid (0.2) | 90/100 | 85/100 |  |
| Example 16 | Resol resin (4.0) / |  | Benzenesulfonic acid (0.2) | 80/100 | 95/100 |  |

(Note 4)
UPE-St : Unsaturated polyester with 30% of styrene monomer
MMA : Methylmethacrylate
$A_1$ : Phenol masked trimethylolpropane-toluenediisocyanate adduct (NCO content 12%)
$B_1$ : Polyester havng hydroxy groups at terminals which is obtained from the reaction of phthalic acid, adipic acid and hexanetriol. (OH value 280–300)

EPX : Glycidyl type epoxy compound $(CH_2\text{—}CH\text{—}CH_2\text{—}O\text{-}(CH_2CH(CH_3)\text{—}O)_nCH_2\text{—}CH\text{—}CH_2$ with epoxide groups, n: about 5.6)

DICY : Dicyandiamide
The other compounds are the same as described in Note 1 of Table 1 and Note 3 of Table 3.

TABLE 5

|  | Compounding ingredients (amount, phr) | | Electron rays irradiation | Adhesion for Paints | |
|---|---|---|---|---|---|
|  |  |  |  | AERON | SUNPHTHAL |
| Example 17 | C-PB (2.0) / | M-DAP (1.0) | 20 Mrad | 100/100 | 100/100 |
| Comparative Example 10 | C-PB (2.0) / | M-DAP (1.0) | none | 0/100 | 0/100 |

TABLE 5-continued

| | Compounding ingredients (amount, phr) | Electron rays irradiation | Adhesion for Paints AERON | SUNPHTHAL |
|---|---|---|---|---|
| Comparative Example 11 | none | 20 Mrad | 0/100 | 0/100 |

TABLE 6

| | Amount of the Mixture phr | Adhesion for Paint (AERON) | YS | TE | TM | Izod |
|---|---|---|---|---|---|---|
| Comparative Example 12 | 0 | 0/100 | 250 | 400 | 11,400 | 4.3 |
| Example 20 | 0.5 | 20/100 | 245 | 350 | 11,000 | 4.2 |
| Example 21 | 1.0 | 70/100 | 230 | 300 | 10,000 | 4.5 |
| Example 22 | 3.0 | 100/100 | 225 | 200 | 9,500 | 5.0 |
| Example 23 | 5.0 | 100/100 | 200 | 150 | 8,000 | 5.5 |
| Example 24 | 10.0 | 100/100 | 180 | 120 | 9,000 | 4.0 |
| Example 25 | 15.0 | 100/100 | 160 | 100 | 10,000 | 3.5 |

Mechanical Properties: YS, TE, TM, Izod

TABLE 7

| | Original Material of the Test Pieces | Heating Condition of the oven | Adhesion for Paints AERON |
|---|---|---|---|
| Example 26 | Composition 1 | 240°C × 15 min. | 100/100 |
| Comparative Example 13 | " | 240°C × 15 min. | 0/100 |
| Comparative Example 14 | " | 330°C × 10 min. | 40/100 |
| Example 27 | Composition 2 | 240°C × 15 min. | 95/100 |
| Comparative Example 15 | " | 240°C × 15 min. | 40/100 |
| Comparative Example 16 | " | 330°C × 10 min. | 30/100 |
| Comparative Example 17 | Polyethylene | 330°C × 10 min. | 0/100 |

What is claimed is:

1. A powder molding process for producing thermoplastic articles having improved surface properties which comprises dry blending a powdery thermoplastic polymer and a curable additive selected from reactive monomers and prepolymers thereof, said curable additive being a liquid at the melting or softening temperature of the thermoplastic polymer and being capable of bleeding to the surface of the thermoplastic polymer during molding, to form a moldable composition, and powder molding said composition by heating it in a mold to initiate melting or softening of the thermoplastic polymer, said heating being controlled at a heating rate of less than 25°C. per minute during the linear portion of the temperature-time curve after the initiation of melting or softening of the thermoplastic polymer, whereby said curable additive bleeds to the surface of the thermoplastic polymer during molding and cures at said surface so as to improve the surface characteristics thereof.

2. The process of claim 1, wherein said heating rate is about 10° to 20°C. per minute.

3. The process of claim 1, wherein the amount of curable additive in the molding composition is from about 0.5% to 15.0% by weight, based on the weight of the thermoplastic polymer.

4. The process of claim 1, wherein said heating rate is about 10° to 20°C. per minute, and the amount of curable additive in the molding composition is from about 0.5% to 15.0% by weight, based on the weight of the thermoplastic polymer.

5. The process of claim 1, wherein the amount of curable additive in the molding composition is from about 1.0% to 10.0% by weight, based on the weight of the thermoplastic polymer.

6. The process of claim 1, wherein the molding composition includes a curing agent.

7. The process of claim 6, wherein the amount of curing agent in the molding composition is about 0.01% to 5.0% by weight, based on the weight of the thermoplastic polymer.

8. The process of claim 1, wherein the thermoplastic polymer is selected from the group consisting of polyolefins, copolymers of olefins, polyamides, polycarbonates, polyoxymethylene, polyvinyl chloride, polystyrene, acrylonitrile-butadiene-styrene copolymers, butyrate resins and acrylic resins.

9. The process of claim 1, wherein the curable additive is selected from the group consisting of allyl ester monomers and prepolymers thereof, diene polymers and modified diene polymers having an absolute viscosity of 1 to 10,000 poise at 25°C., unsaturated polyester oligomers, acrylic prepolymers, polyisocyanates and/or polyols and prepolymers thereof, urea-formaldehyde precondensates, epoxy-containing prepolymers, furan resin precondensates, resol resin precondensates and xylene resin precondensates.

10. The process of claim 1, wherein the molding process is carried out by rotational molding.

* * * * *